United States Patent
Thomas et al.

(10) Patent No.: US 8,739,826 B2
(45) Date of Patent: Jun. 3, 2014

(54) CENTERSET FAUCET BODY AND METHOD OF MAKING SAME

(75) Inventors: Kurt J. Thomas, Indianapolis, IN (US); Brian A. Enlow, Noblesville, IN (US); Timothy J. Sailors, Westfield, IN (US); Derek A. Brown, Lizton, IN (US); Earl G. Christian, Jr., Warren, OH (US)

(73) Assignees: Masco Corporation of Indiana, Indianapolis, IN (US); Mercury Plastics, Inc., Middlefield, OH (US)

( * ) Notice: Subject to any disclaimer, the term of this patent is extended or adjusted under 35 U.S.C. 154(b) by 314 days.

(21) Appl. No.: 13/087,586

(22) Filed: Apr. 15, 2011

(65) Prior Publication Data

US 2012/0227843 A1   Sep. 13, 2012

Related U.S. Application Data

(60) Provisional application No. 61/451,944, filed on Mar. 11, 2011.

(51) Int. Cl.
*E03B 1/00* (2006.01)

(52) U.S. Cl.
USPC ............................................ 137/606; 137/801

(58) Field of Classification Search
USPC ...................... 137/606, 625.4, 625.41, 801
See application file for complete search history.

(56) References Cited

U.S. PATENT DOCUMENTS

| | | |
|---|---|---|
| 2,200,091 A | 5/1940 | Kovach |
| 2,219,471 A | 10/1940 | Davis |
| 2,546,327 A | 3/1951 | Young |
| 2,548,933 A | 4/1951 | Barnett |
| 2,781,786 A | 2/1957 | Young |
| 2,884,007 A | 4/1959 | Green |
| 3,229,710 A | 1/1966 | Keller, III |
| 3,422,849 A | 1/1969 | Manoogian |
| 3,448,768 A | 6/1969 | Keller |
| 3,505,098 A | 4/1970 | Miller et al. |
| 3,520,325 A | 7/1970 | Stuart |
| 3,580,289 A | 5/1971 | James et al. |
| 3,590,876 A | 7/1971 | Young |
| 3,600,723 A | 8/1971 | Mongerson et al. |
| 3,635,405 A | 1/1972 | Shames et al. |
| 3,645,493 A | 2/1972 | Manoogian et al. |
| 3,714,958 A | 2/1973 | Johnson et al. |
| 3,736,959 A | 6/1973 | Parkison |
| 3,757,824 A | 9/1973 | Parkhurst et al. |
| 3,770,004 A | 11/1973 | Johnson et al. |

(Continued)

FOREIGN PATENT DOCUMENTS

| | | |
|---|---|---|
| DE | 10133041 | 1/2003 |
| EP | 0 632 220 | 1/1995 |

(Continued)

OTHER PUBLICATIONS

Dadex Polydex—PPR Pipe System for Hot and Cold Water Supply and Distribution, 2005, 2 pgs.

(Continued)

*Primary Examiner* — John K Fristoe, Jr.
*Assistant Examiner* — Reinaldo Sanchez-Medina
(74) *Attorney, Agent, or Firm* — Faegre Baker Daniels LLP

(57) ABSTRACT

A molded waterway assembly for a centerset faucet including a hot water inlet tube, a cold water inlet tube, and a central body of a coupler overmolded within hot and cold water bodies of the coupler.

11 Claims, 10 Drawing Sheets

(56) References Cited

U.S. PATENT DOCUMENTS

| | | |
|---|---|---|
| 3,788,601 A | 1/1974 | Schmitt |
| 3,796,380 A | 3/1974 | Johnson et al. |
| 3,807,453 A | 4/1974 | Dom et al. |
| 3,810,602 A | 5/1974 | Parkinson |
| 3,834,416 A | 9/1974 | Parkison |
| 3,854,493 A | 12/1974 | Farrell |
| 3,960,016 A | 6/1976 | Symmons |
| 3,965,936 A | 6/1976 | Lyon |
| 3,989,787 A | 11/1976 | Scott, Jr. et al. |
| 3,998,240 A | 12/1976 | Liautaud |
| 4,026,328 A | 5/1977 | Nelson |
| 4,058,289 A | 11/1977 | Hicks |
| 4,076,279 A | 2/1978 | Klotz et al. |
| 4,103,709 A | 8/1978 | Fischer |
| 4,130,136 A | 12/1978 | Garnier et al. |
| 4,221,338 A | 9/1980 | Shames et al. |
| 4,316,870 A | 2/1982 | Rowley |
| 4,337,795 A | 7/1982 | Argyris et al. |
| 4,356,574 A | 11/1982 | Johnson |
| 4,357,957 A | 11/1982 | Bisonaya et al. |
| 4,387,738 A | 6/1983 | Bisonaya et al. |
| 4,397,330 A | 8/1983 | Hayman |
| 4,415,389 A | 11/1983 | Medford et al. |
| 4,446,084 A | 5/1984 | Rowley |
| 4,453,567 A | 6/1984 | MacDonald |
| 4,458,839 A | 7/1984 | MacDonald |
| 4,465,259 A | 8/1984 | Allen et al. |
| 4,484,600 A | 11/1984 | Peterson et al. |
| 4,502,507 A | 3/1985 | Hayman |
| 4,513,769 A | 4/1985 | Purcell |
| 4,525,136 A | 6/1985 | Rowley |
| 4,552,171 A | 11/1985 | Farrell et al. |
| 4,577,835 A | 3/1986 | Holycross et al. |
| 4,580,601 A | 4/1986 | Schlotman et al. |
| 4,592,388 A | 6/1986 | Wilcox |
| 4,604,202 A | 8/1986 | Movshovitz |
| 4,607,659 A | 8/1986 | Cole |
| 4,610,429 A | 9/1986 | Arnold et al. |
| 4,626,005 A | 12/1986 | Stifter |
| 4,635,673 A | 1/1987 | Gerdes |
| 4,649,958 A | 3/1987 | Purcell |
| 4,651,770 A | 3/1987 | Denham et al. |
| 4,652,263 A | 3/1987 | Herweck et al. |
| 4,664,423 A | 5/1987 | Rowley |
| 4,667,987 A | 5/1987 | Knebel |
| 4,671,316 A | 6/1987 | Botnick |
| 4,687,025 A | 8/1987 | Kahle et al. |
| 4,700,928 A | 10/1987 | Marty |
| 4,708,172 A | 11/1987 | Riis |
| 4,749,003 A | 6/1988 | Leason |
| 4,754,783 A | 7/1988 | Knapp |
| 4,754,993 A | 7/1988 | Kraynick |
| 4,760,871 A | 8/1988 | Vijay |
| 4,762,143 A | 8/1988 | Botnick |
| 4,773,348 A | 9/1988 | Rowley |
| 4,783,303 A | 11/1988 | Imgram |
| 4,793,375 A | 12/1988 | Marty |
| 4,803,033 A | 2/1989 | Rowley |
| 4,838,304 A | 6/1989 | Knapp |
| 4,853,164 A | 8/1989 | Kiang et al. |
| 4,877,660 A | 10/1989 | Overbergh et al. |
| 4,887,642 A | 12/1989 | Bernat |
| 4,942,644 A | 7/1990 | Rowley |
| 4,957,135 A | 9/1990 | Knapp |
| 4,971,112 A | 11/1990 | Knapp |
| 4,979,530 A | 12/1990 | Breda |
| 4,981,156 A | 1/1991 | Nicklas et al. |
| 5,001,008 A | 3/1991 | Tokita et al. |
| 5,006,207 A | 4/1991 | Peterman et al. |
| 5,024,419 A | 6/1991 | Mulvey |
| 5,027,851 A | 7/1991 | Drees et al. |
| 5,053,097 A | 10/1991 | Johansson et al. |
| 5,090,062 A | 2/1992 | Hochstrasser |
| 5,095,554 A | 3/1992 | Gloor |
| 5,100,565 A | 3/1992 | Fujiwara et al. |
| 5,110,044 A | 5/1992 | Bergmann |
| 5,127,814 A | 7/1992 | Johnson et al. |
| 5,131,428 A | 7/1992 | Bory |
| 5,148,837 A | 9/1992 | Ågren et al. |
| 5,150,922 A | 9/1992 | Nakashiba et al. |
| 5,174,324 A | 12/1992 | Chrysler |
| 5,219,185 A | 6/1993 | Oddenino |
| 5,279,333 A | 1/1994 | Lawerence |
| 5,340,018 A | 8/1994 | Macdonald et al. |
| 5,355,906 A | 10/1994 | Marty et al. |
| 5,364,135 A | 11/1994 | Anderson |
| 5,366,253 A | 11/1994 | Nakashiba et al. |
| 5,375,889 A | 12/1994 | Nakashiba et al. |
| 5,397,102 A | 3/1995 | Kingman |
| 5,402,827 A | 4/1995 | Gonzalez |
| 5,417,242 A | 5/1995 | Goncze |
| 5,437,345 A | 8/1995 | Schmidt et al. |
| 5,493,873 A | 2/1996 | Donselman et al. |
| 5,494,259 A | 2/1996 | Peterson |
| 5,518,027 A | 5/1996 | Saiki et al. |
| 5,527,503 A | 6/1996 | Rowley |
| 5,553,935 A | 9/1996 | Burnham et al. |
| 5,555,912 A | 9/1996 | Saadi et al. |
| 5,558,128 A | 9/1996 | Pawelzik et al. |
| 5,566,707 A | 10/1996 | Ching et al. |
| 5,573,037 A | 11/1996 | Cole et al. |
| 5,577,393 A | 11/1996 | Donselman et al. |
| 5,579,808 A | 12/1996 | Mikol et al. |
| 5,582,438 A | 12/1996 | Wilkins et al. |
| 5,586,746 A | 12/1996 | Humpert et al. |
| 5,611,093 A | 3/1997 | Barnum et al. |
| 5,615,709 A | 4/1997 | Knapp |
| 5,622,210 A | 4/1997 | Crisman et al. |
| 5,622,670 A | 4/1997 | Rowley |
| 5,642,755 A | 7/1997 | Mark et al. |
| 5,660,692 A | 8/1997 | Nesburn et al. |
| 5,669,407 A | 9/1997 | Bailey |
| 5,669,417 A | 9/1997 | Lian-Jie |
| 5,669,595 A | 9/1997 | Bytheway |
| 5,685,341 A | 11/1997 | Chrysler et al. |
| 5,687,952 A | 11/1997 | Arnold et al. |
| 5,692,536 A | 12/1997 | Tokarz |
| 5,695,094 A | 12/1997 | Burnham et al. |
| 5,725,008 A | 3/1998 | Johnson |
| 5,725,010 A | 3/1998 | Marty et al. |
| 5,730,173 A | 3/1998 | Sponheimer |
| 5,741,458 A | 4/1998 | Rowley |
| 5,746,244 A | 5/1998 | Woolley, Sr. et al. |
| 5,756,023 A | 5/1998 | Stachowiak |
| 5,758,690 A | 6/1998 | Humpert et al. |
| 5,775,587 A | 7/1998 | Davis |
| 5,803,120 A | 9/1998 | Bertoli |
| 5,813,435 A | 9/1998 | Knapp |
| 5,832,952 A | 11/1998 | Cook et al. |
| 5,833,279 A | 11/1998 | Rowley |
| 5,850,855 A | 12/1998 | Kerschbaumer et al. |
| 5,857,489 A | 1/1999 | Chang |
| 5,861,200 A | 1/1999 | Rowley |
| 5,865,473 A | 2/1999 | Semchuchk et al. |
| 5,875,809 A | 3/1999 | Barrom |
| 5,893,387 A | 4/1999 | Paterson et al. |
| 5,895,695 A | 4/1999 | Rowley |
| 5,916,647 A | 6/1999 | Weinstein |
| 5,924,451 A | 7/1999 | Kuo |
| 5,927,333 A | 7/1999 | Grassberger |
| 5,931,374 A | 8/1999 | Knapp |
| 5,934,325 A | 8/1999 | Brattoli et al. |
| 5,937,892 A | 8/1999 | Meisner et al. |
| 5,944,225 A | 8/1999 | Kawolics |
| 5,950,663 A | 9/1999 | Bloomfield |
| 5,960,490 A | 10/1999 | Pitch |
| 5,965,077 A | 10/1999 | Rowley et al. |
| 5,975,143 A | 11/1999 | Järvenkylä et al. |
| 5,979,489 A | 11/1999 | Pitch |
| 6,013,382 A | 1/2000 | Coltrinari et al. |
| 6,023,796 A | 2/2000 | Pitch |
| 6,029,860 A | 2/2000 | Donselman et al. |
| 6,029,948 A | 2/2000 | Shafer |
| 6,044,869 A | 4/2000 | Koob |

(56) References Cited

U.S. PATENT DOCUMENTS

| | | | |
|---|---|---|---|
| 6,053,214 A | 4/2000 | Sjoberg et al. |
| 6,062,251 A | 5/2000 | Pitch |
| 6,070,614 A | 6/2000 | Holzheimer et al. |
| 6,070,916 A | 6/2000 | Rowley |
| 6,073,972 A | 6/2000 | Rivera |
| 6,079,447 A | 6/2000 | Holzheimer et al. |
| 6,082,407 A | 7/2000 | Paterson et al. |
| 6,082,780 A | 7/2000 | Rowley et al. |
| 6,085,784 A | 7/2000 | Bloom et al. |
| 6,116,884 A | 9/2000 | Rowley |
| 6,123,232 A | 9/2000 | Donselman et al. |
| 6,131,600 A | 10/2000 | Chang |
| 6,138,296 A | 10/2000 | Baker |
| 6,155,297 A | 12/2000 | MacAusland et al. |
| 6,161,230 A | 12/2000 | Pitsch |
| 6,170,098 B1 | 1/2001 | Pitsch |
| 6,177,516 B1 | 1/2001 | Hudak |
| 6,202,686 B1 | 3/2001 | Pitsch et al. |
| 6,227,464 B1 | 5/2001 | Allmendinger et al. |
| 6,238,575 B1 | 5/2001 | Patil |
| 6,256,810 B1 | 7/2001 | Baker |
| 6,270,125 B1 | 8/2001 | Rowley et al. |
| 6,286,808 B1 | 9/2001 | Slothower et al. |
| 6,287,501 B1 | 9/2001 | Rowley |
| 6,293,336 B1 | 9/2001 | Emerick, Sr. et al. |
| 6,296,017 B2 | 10/2001 | Kimizuka |
| 6,305,407 B1 | 10/2001 | Selby |
| 6,315,715 B1 | 11/2001 | Taylor et al. |
| 6,328,059 B1 | 12/2001 | Testori et al. |
| 6,334,466 B1 | 1/2002 | Jani et al. |
| 6,341,617 B1 | 1/2002 | Wilson |
| 6,349,733 B1 | 2/2002 | Smith |
| 6,378,790 B1 | 4/2002 | Paterson et al. |
| 6,385,794 B1 | 5/2002 | Miedzius et al. |
| 6,439,581 B1 | 8/2002 | Chang |
| 6,462,167 B1 | 10/2002 | Nodera et al. |
| 6,464,266 B1 | 10/2002 | O'Neill et al. |
| 6,485,666 B1 | 11/2002 | Rowley |
| 6,517,006 B1 | 2/2003 | Knapp |
| 6,557,907 B2 | 5/2003 | Rowley |
| 6,609,732 B1 | 8/2003 | Souvatzidis et al. |
| 6,635,334 B1 | 10/2003 | Jackson et al. |
| 6,640,357 B1 | 11/2003 | Chang |
| 6,732,543 B2 | 5/2004 | Jenkins, Jr. et al. |
| 6,770,376 B2 | 8/2004 | Chen |
| 6,770,384 B2 | 8/2004 | Chen |
| 6,783,160 B2 | 8/2004 | Rowley |
| 6,803,133 B2 | 10/2004 | Chen |
| 6,817,379 B2 | 11/2004 | Perla |
| 6,835,777 B2 | 12/2004 | Botros |
| 6,838,041 B2 | 1/2005 | Rowley |
| 6,848,719 B2 | 2/2005 | Rowley |
| 6,860,523 B2 | 3/2005 | O'Neill et al. |
| 6,860,524 B1 | 3/2005 | Rowley |
| 6,877,172 B2 | 4/2005 | Malek et al. |
| 6,880,573 B2 | 4/2005 | Berkman et al. |
| 6,894,115 B2 | 5/2005 | Botros |
| 6,902,210 B1 | 6/2005 | Rowley |
| 6,920,899 B2 | 7/2005 | Haenlein et al. |
| 6,959,729 B2 | 11/2005 | Graber |
| 6,959,736 B2 | 11/2005 | Järvenkylä |
| 6,962,168 B2 | 11/2005 | McDaniel et al. |
| 6,978,795 B2 | 12/2005 | Perrin |
| 7,055,545 B2 | 6/2006 | Mascari et al. |
| 7,063,105 B1 | 6/2006 | Chen |
| 7,111,640 B2 | 9/2006 | Rhodes |
| 7,118,138 B1 | 10/2006 | Rowley et al. |
| 7,124,776 B1 | 10/2006 | Hwang |
| 7,134,452 B2 | 11/2006 | Hiroshi et al. |
| 7,140,390 B2 | 11/2006 | Berkman et al. |
| 7,225,828 B2 | 6/2007 | Giagni et al. |
| 7,231,936 B2 | 6/2007 | Chang |
| 7,406,980 B2 | 8/2008 | Pinette |
| 7,766,043 B2 | 8/2010 | Thomas et al. |
| 7,793,677 B2 | 9/2010 | Pinette |
| 2002/0100139 A1 | 8/2002 | Rowley |
| 2002/0100510 A1 | 8/2002 | Otelli |
| 2002/0167171 A1 | 11/2002 | Becker et al. |
| 2003/0183286 A1 | 10/2003 | Yang |
| 2004/0007278 A1 | 1/2004 | Williams |
| 2004/0021120 A1 | 2/2004 | Turnau, III et al. |
| 2004/0060608 A1 | 4/2004 | Angus |
| 2004/0117906 A1 | 6/2004 | Baker et al. |
| 2004/0150132 A1 | 8/2004 | Rowley |
| 2004/0176503 A1 | 9/2004 | Czayka et al. |
| 2005/0005989 A1 | 1/2005 | Roloff |
| 2005/0194051 A1 | 9/2005 | Pinette |
| 2006/0108705 A1 | 5/2006 | Rowley |
| 2006/0118185 A1 | 6/2006 | Nobili |
| 2006/0124183 A1 | 6/2006 | Kuo |
| 2006/0130908 A1 | 6/2006 | Marty et al. |
| 2006/0170134 A1 | 8/2006 | Rowley et al. |
| 2006/0174955 A1 | 8/2006 | Huang |
| 2006/0191580 A1 | 8/2006 | Sponheimer et al. |
| 2006/0200904 A1 | 9/2006 | Vogel et al. |
| 2006/0202142 A1 | 9/2006 | Marty et al. |
| 2007/0044852 A1 | 3/2007 | Pinette |
| 2007/0137714 A1 | 6/2007 | Meehan et al. |
| 2007/0137718 A1 | 6/2007 | Rushlander et al. |
| 2007/0271695 A1 | 11/2007 | Thomas et al. |
| 2008/0289709 A1 | 11/2008 | Pinette |
| 2009/0078322 A1 | 3/2009 | Thomas et al. |
| 2010/0096034 A1 | 4/2010 | Hou |
| 2011/0079307 A1 | 4/2011 | Marty et al. |
| 2011/0259456 A1 | 10/2011 | Pinette et al. |

FOREIGN PATENT DOCUMENTS

| | | |
|---|---|---|
| EP | 0 808 952 | 11/1997 |
| EP | 1 072 830 | 9/2004 |
| JP | 3094877 | 4/1991 |
| JP | 200132343 | 6/2001 |
| WO | WO 91/05191 | 4/1991 |
| WO | WO 00/61831 | 10/2000 |
| WO | WO 02/25022 | 3/2002 |
| WO | WO 2005/108829 | 11/2005 |
| WO | WO 2006/099273 | 9/2006 |
| WO | WO 2009/126887 | 10/2009 |
| WO | WO 2009/155529 | 12/2009 |
| WO | WO 2009/158497 | 12/2009 |
| WO | WO 2009/158498 | 12/2009 |

OTHER PUBLICATIONS

Dadex Polydex, 2005, 1 pg.
Dow, Plastic Pipes Europe, Middle East & Africa, Hot and Cold Water Pipes, 2007, 1 pg.
Dow, Plastic Pipes Europe, Middle East, & Africa, Dowlex PE-RT, 2007, 2 pgs.
Kerox, Ceramic Mixing Cartridge, Conventional Single-Lever Type, Model K-28, at least as early as Jan. 31, 2007, 2 pgs.
Kerox, Standard Cartridges, 2005, 3 pgs.
Noveon, Inc.; Processing with TempRite® PEX Ensures Quality Piping, www.tempritepex.com/processingInstallation/processing.asp, at least as early as Jun. 7, 2005, 2 pgs.
PEX Association, What is PE-X?, at least as early as Jan. 31, 2007, 7 pgs.
PPI Plastics Pipe Institute, Crosslinked Polyethylene (PEX) Tubing, TN-17/2001, www.plasticpipe.org/pdf/pubs/notes/tn17-01.pdf, Jun. 2001, 7 pgs.
SpecialChem S.A., Silane Crosslinking Agents Center, Crosslinking Mechanism, www.specialchem4polymers.com/tc/silane-crosslinking-agents/index.aspx?id=mechanism, at least as early as Jun. 7, 2005, 2 pgs.
Ticona Engineering Polymers, Engineering Polymers for Innovative Applications catalog, Mar. 2006, 16 pgs.
International Search Report and Written Opinion for PCT Application No. PCT/US2009/048657, issued Aug. 14, 2009, 14 pgs.

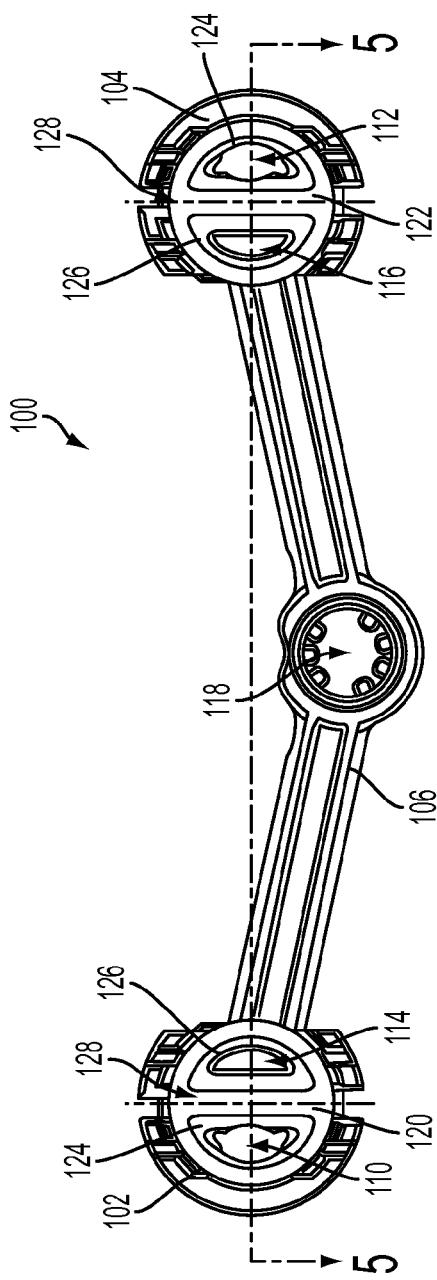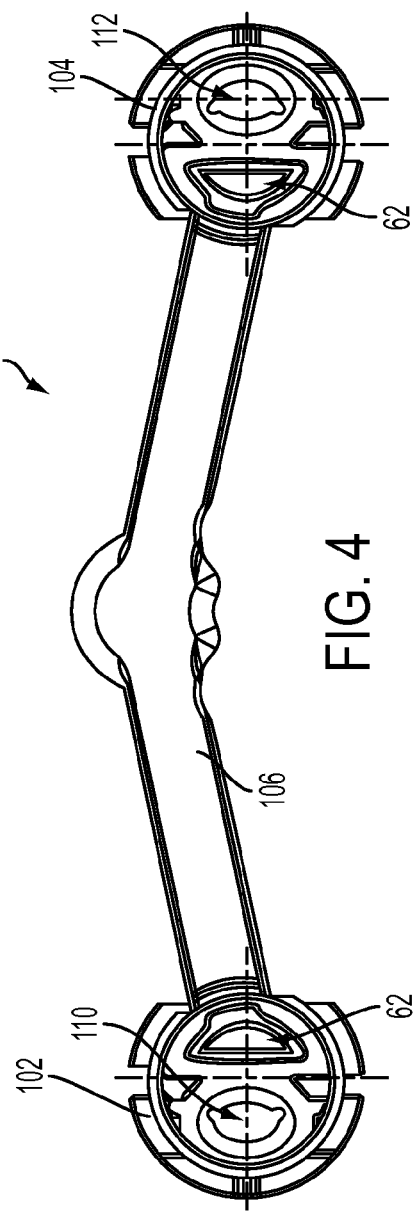

CENTERSET FAUCET BODY AND METHOD OF MAKING SAME

CROSS-REFERENCE TO RELATED APPLICATION

This application claims priority from U.S. Provisional Patent Application Ser. No. 61/451,944, entitled "Centerset Faucet Body and Method of Making Same," filed Mar. 11, 2011, the disclosure of which is hereby expressly incorporated by reference herein in its entirety.

BACKGROUND AND SUMMARY OF THE INVENTION

The present invention relates generally to plumbing fixtures and, more particularly, to a faucet including a molded waterway assembly and to a method of making the same.

Faucets are generally controlled by either a single handle which utilizes a mixing valve to proportion the flow of hot water and cold water to a delivery spout, or dual handles which utilize two separate valves to independently control the flow of hot water and cold water. In a conventional dual handle faucet, the hot water and cold water valve bodies, which house the respective hot water and cold water valves, are each typically connected to an upstream waterway through a conventional mechanical connection, such as mating threads. Further, each valve body is typically connected to a separate downstream waterway. In certain examples, the valve bodies and the downstream waterways are sand cast from brass, or are machined from brass components and combined through brazing. Sand casting is typically a manual low-tech process that if not controlled properly may lead to failures through pin holes or porosity. One of the potential problems with a brazing connection is that undesirable materials, such as harmful metals, may be communicated from the brazing material into the water passageway through the brazed connection. Further, brazing is often a variable process that may lead to failures. Additionally, brazing often requires an etching operation to be performed subsequent thereto.

According to an illustrative embodiment of the present disclosure, a method is provided for forming a waterway for use with a centerset faucet, the faucet including a first water supply, a second water supply, a first valve, a second valve, and an outlet tube. The method comprising the steps of: molding a central body of a coupler having an outlet channel that is configured for fluid communication with the outlet tube; providing a first flexible tube including opposing proximal and distal ends, the first flexible tube configured for fluid communication with the first water supply; providing a second flexible tube including opposing proximal and distal ends, the second flexible tube configured for fluid communication with the second water supply; overmolding a first body of the coupler around the central body of the coupler and around the first flexible tube, the first body of the coupler defining at least a portion of a first valve interface for communicating with the first valve; and overmolding a second body of the coupler around the central body of the coupler and around the second flexible tube, the second body of the coupler defining at least a portion of a second valve interface for communicating with the second valve, the second valve interface being in spaced relation to the first valve interface.

According to another illustrative embodiment of the present disclosure, a method is provided for forming a waterway for use with a centerset faucet, the faucet including a first water supply, a second water supply, a first valve, a second valve, and an outlet tube. The method includes the steps of: molding a central body of a coupler, the central body of the coupler defining a first intermediate channel, a second intermediate channel, and an outlet channel, the first intermediate channel configured to direct fluid from the first valve to the outlet channel, the second intermediate channel configured to direct fluid from the second valve to the outlet channel, and the outlet channel configured to direct fluid to the outlet tube; providing a first flexible tube including opposing proximal and distal ends, the first flexible tube configured for fluid communication with the first water supply; providing a second flexible tube including opposing proximal and distal ends, the second flexible tube configured for fluid communication with the second water supply; overmolding a first body of the coupler around the central body of the coupler and around the first flexible tube, the first body of the coupler defining a first inlet channel configured to direct fluid from the first flexible tube to the first valve; and overmolding a second body of the coupler around the central body of the coupler and around the second flexible tube, the second body of the coupler defining a second inlet channel configured to direct fluid from the second flexible tube to the second valve.

According to yet another illustrative embodiment of the present disclosure, a waterway assembly is provided for use with a centerset faucet, the faucet including a hot water valve, a cold water valve, and an outlet tube. The waterway assembly includes a hot water inlet tube including opposing proximal and distal ends, a cold water inlet tube including opposing proximal and distal ends, and a coupler including a central body that defines a hot water intermediate channel, a cold water intermediate channel, and an outlet channel, the hot water intermediate channel configured to direct fluid from the hot water valve to the outlet channel, the cold water intermediate channel configured to direct fluid from the cold water valve to the outlet channel, and the outlet channel configured to direct fluid from the hot and cold water intermediate channels to the outlet tube, a hot water body overmolded onto the central body and the proximal end of the hot water inlet tube, the hot water body defining a hot water inlet channel configured to direct fluid from the hot water inlet tube to the hot water valve, and a cold water body overmolded onto the central body and the proximal end of the cold water inlet tube, the cold water body defining a cold water inlet channel configured to direct fluid from the cold water inlet tube to the cold water valve.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 3 is a top plan view of the molded waterway of FIG. 2, the molded waterway shown without the hot and cold inlet tubes;

FIG. 4 is a bottom plan view of the molded waterway of FIG. 3;

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
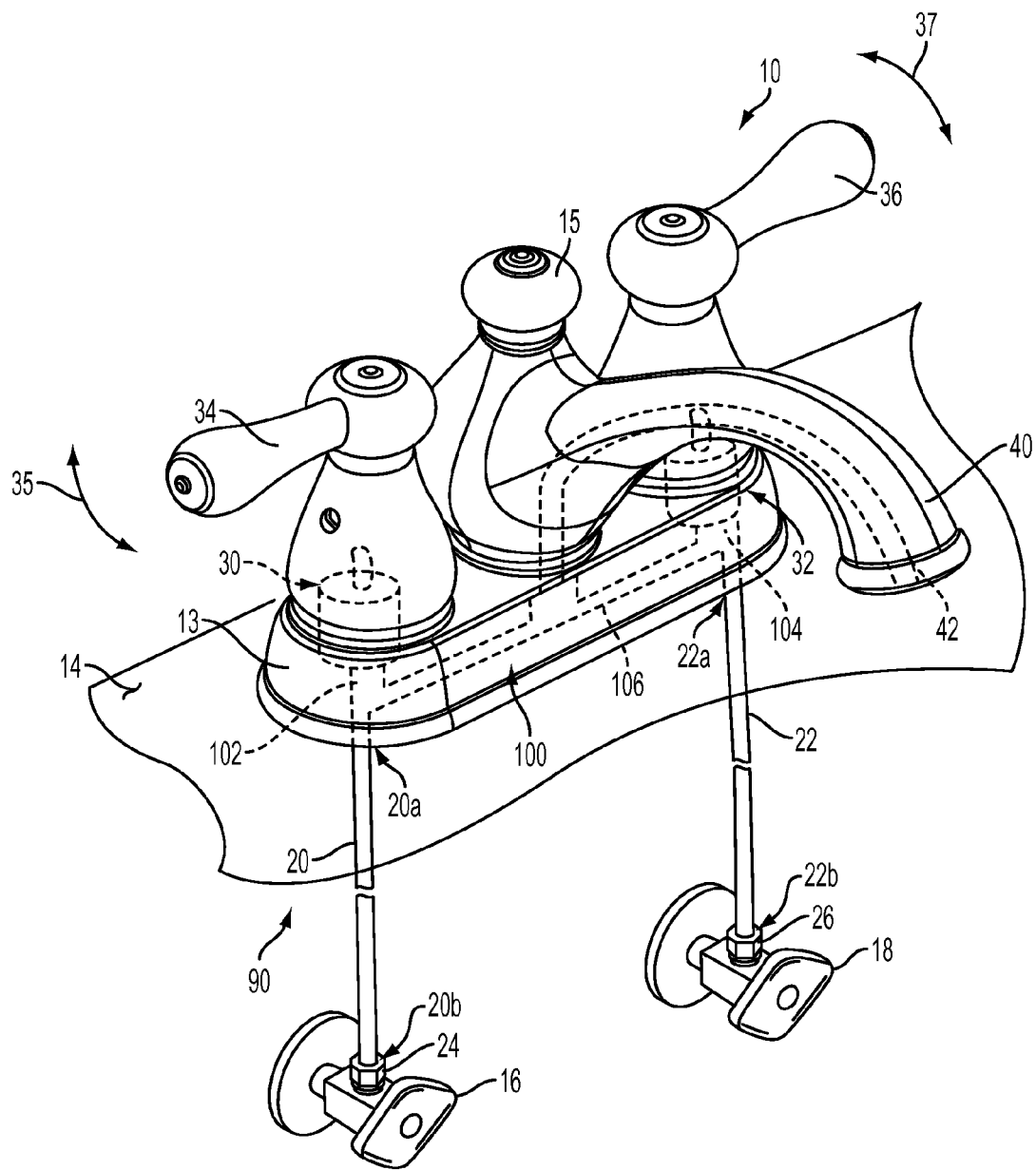
FIG. 1 is a perspective view of an illustrative faucet of the present disclosure mounted to a sink deck and fluidly coupled to hot and cold water supply lines.
Figure 2:
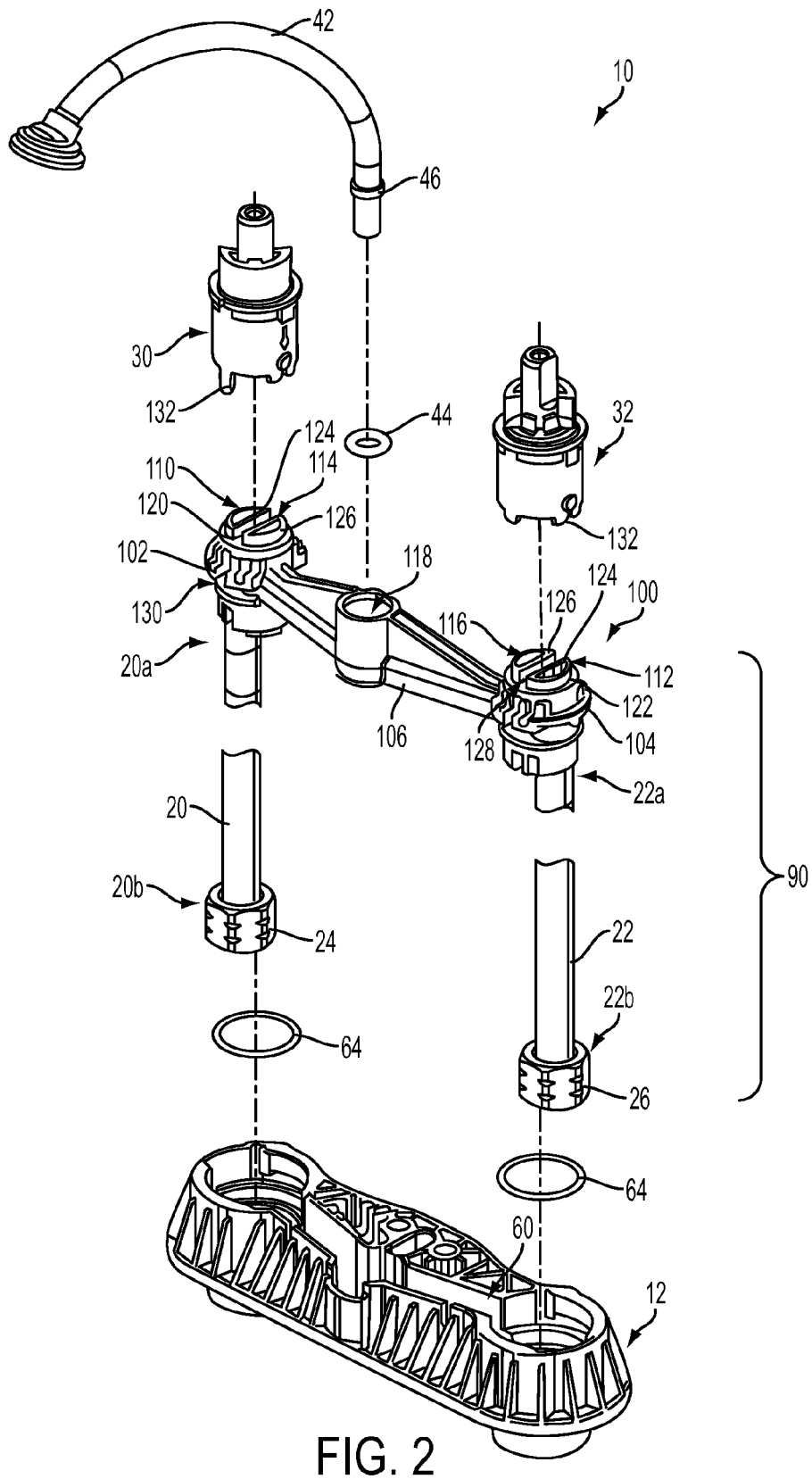
FIG. 2 is an exploded perspective view of a portion of the illustrative faucet of FIG. 1, the faucet including an illustrative molded waterway including a hot water body, a cold water body, a central body, and hot and cold inlet tubes.

Referring initially to FIGS. 1 and 2, an illustrative embodiment faucet 10 is shown mounted atop sink deck 14. The illustrative faucet 10 includes base 12 and escutcheon 13, which may be attached to sink deck 14 with plastic shanks, threaded bolts, or other suitable fasteners (not shown).

Faucet 10 is fluidly coupled to hot water supply 16 and cold water supply 18 through conventional stops (not shown). Hot and cold water fluid transport components are provided in the form of inlet tubes 20 and 22. Hot water inlet tube 20 includes proximal end 20a and an opposing distal end 20b. Similarly, cold water inlet tube 22 includes proximal end 22a and an opposing distal end 22b. Illustratively, inlet tubes 20 and 22 are flexible such that the distal ends 20b and 22b may be manipulated relative to the respective proximal ends 20a and 22a. For example, inlet tubes 20 and 22 may be formed of a polymer, such as an olefin or a polyethylene. In one illustrative embodiment, inlet tubes 20 and 22 are formed of a polyethylene which has been cross-linked to form cross-linked polyethylene (PEX). However, it should be appreciated that other suitable materials may be substituted therefor.

While the illustrative inlet tubes 20 and 22 define a circular cross-section, it should be noted that the cross-sectional shape of inlet tubes 20 and 22 may vary. For example, to facilitate subsequent molding operations, the cross-section of proximal ends 20a and 22a of inlet tubes 20 and 22 may be oval-shaped or D-shaped.

As shown in FIG. 1, fluid coupling 24 is provided at distal end 20b of hot water inlet tube 20 for connecting with hot water supply 16, and fluid coupling 26 is provided at distal end 22b of cold water inlet tube 22 for connecting with cold water supply 18. It should be appreciated that inlet tubes 20 and 22 may be directly coupled to the respective hot and cold water stops through corresponding fluid couplings 24 and 26 or, alternatively, to intermediate hot and cold water risers (not shown).

The illustrative faucet 10 also includes a centrally-disposed delivery spout 40 that is supported above escutcheon 13, as shown in FIG. 1. Delivery spout 40 receives outlet tube 42 for delivering a mixed water stream to a sink basin or a tub basin (not shown), for example. As shown in FIG. 2, faucet 10 may include sealing ring 44 to provide a seal beneath collar 46 of outlet tube 42. Sealing ring 44 may be in the form of an elastomeric O-ring, for example.

Between inlet tubes 20 and 22 and outlet tube 42, the illustrative faucet 10 further includes hot water valve 30 and cold water valve 32. Hot water valve 30 is fluidly coupled to hot water inlet tube 20 to deliver hot water to outlet tube 42, and cold water valve 32 is fluidly coupled to cold water inlet tube 22 to deliver cold water to outlet tube 42.

Hot water valve 30 includes valve member 31 that is movable between a first "on" position where hot water from hot water inlet tube 20 is in fluid communication with outlet tube 42, and a second "off" position where hot water from hot water inlet tube 20 is not in fluid communication with outlet tube 42. Valve member 31 may also be movable to a plurality of intermediate positions between the first "on" position and the second "off" position to at least partially restrict the flow of hot water from hot water inlet tube 20 to outlet tube 42. In one illustrative embodiment, valve member 31 of hot water valve 30 is a rotatable disc that may be rotatably adjusted through a hot water user input, such as handle 34. As shown in FIG. 1, handle 34 generally extends above escutcheon 13 of faucet 10 and is rotatable in the direction of arrow 35. It should be appreciated that handle 34 may be replaced with another type of user input, such as a lever.

Similarly, cold water valve 32 includes a valve member 33 that is movable between a first "on" position where cold water from cold water inlet tube 22 is in fluid communication with outlet tube 42, and a second "off" position where cold water from cold water inlet tube 22 is not in fluid communication with outlet tube 42. Valve member 33 may also be movable to a plurality of intermediate positions between the first "on" position and the second "off" position to at least partially restrict the flow of cold water from cold water inlet tube 22 to outlet tube 42. In one illustrative embodiment, valve member 33 of cold water valve 32 is a rotatable disc that may be rotatably adjusted through a cold water user input, such as handle 36. As shown in FIG. 1, handle 36 generally extends above escutcheon 13 of faucet 10 and is rotatable in the direction of arrow 37. As with handle 34 of hot water valve 30, handle 36 of cold water valve 32 may be replaced with another type of user input, such as a lever.

In one illustrative embodiment, valves 30 and 32 of faucet 10 may be of the type disclosed in International Patent Publication No. WO 2009/155529, entitled "Valve Assembly for a Two Handle Faucet." Additional exemplary rotatable valves are disclosed in U.S. Pat. Nos. 3,645,493; 4,453,567; 4,577,835; and 4,700,928.

With reference to FIGS. 2-5, coupler 100 is provided to convey water through faucet 10. The illustrative coupler 100 includes hot water body 102 on one side, cold water body 104 on the other side, and central body 106 extending therebetween. As shown in FIG. 2, hot water body 102 and cold water body 104 may be positioned at least partially rearward of central body 106 to provide adequate space for drain lift rod 15 of faucet 10 (FIG. 1) behind central body 106.

Figure 5:
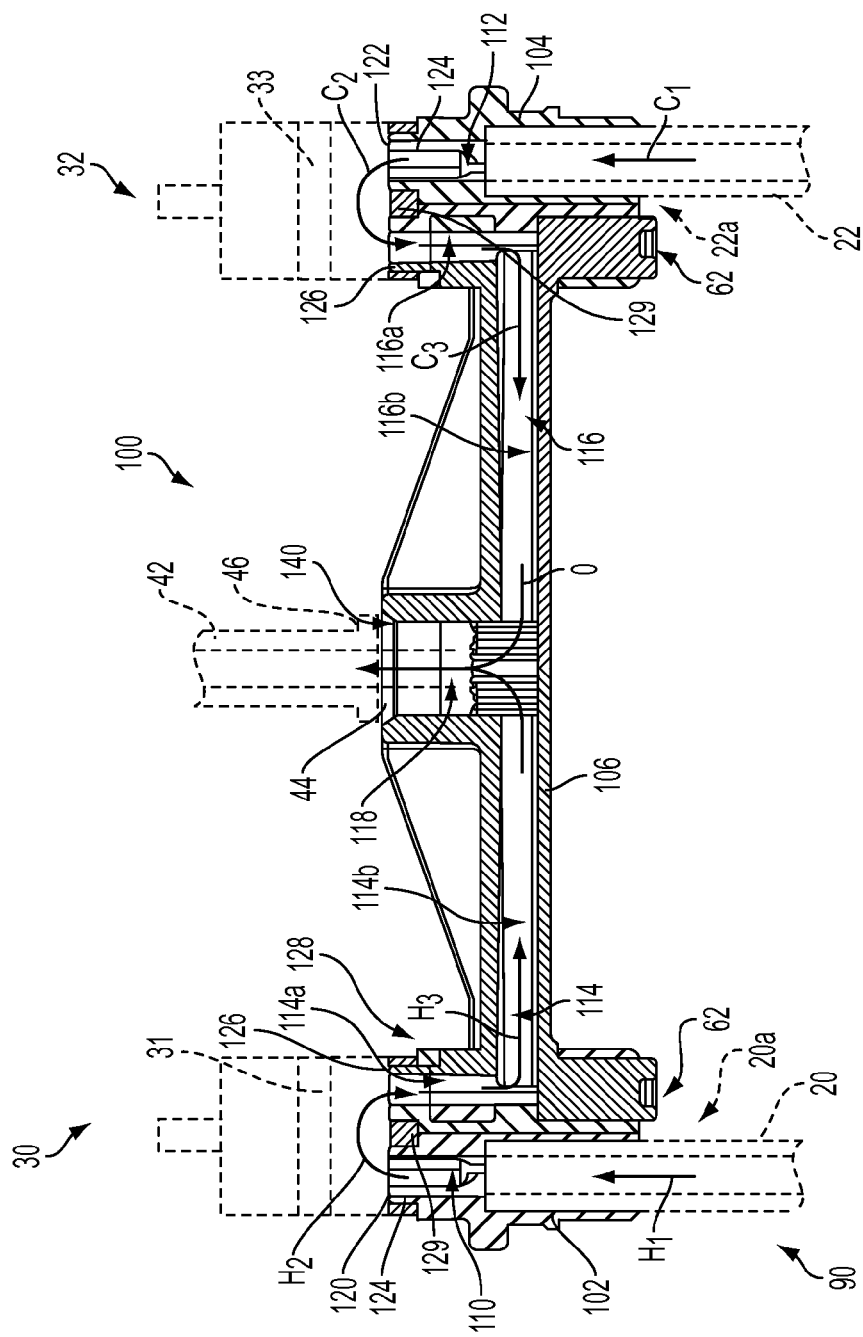
FIG. 5 is a cross-sectional view of the molded waterway of FIG. 3, taken along line 5-5 of FIG. 3.
Figure 6:
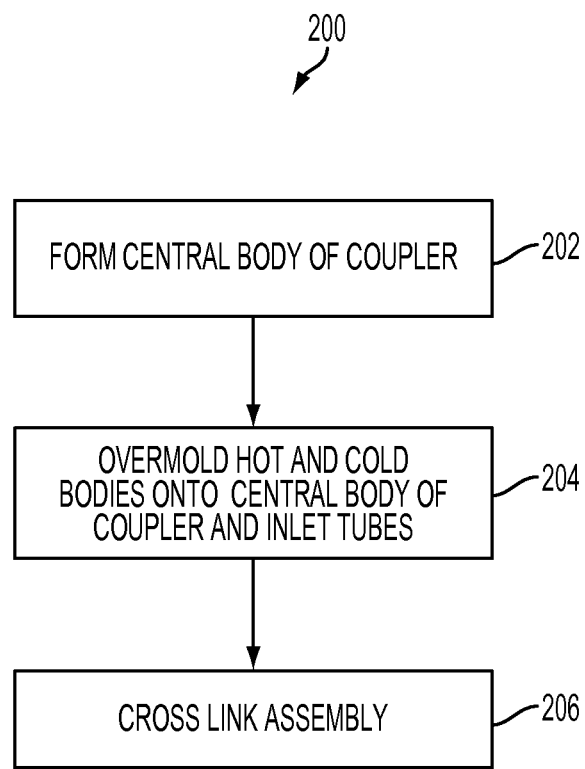
FIG. 6 is a flow chart of an illustrative method of forming the molded waterway of FIG. 2.

Referring to FIG. 5, hot water body 102 of coupler 100 defines hot water inlet channel 110 and cold water body 104 of coupler 100 defines cold water inlet channel 112. Between inlet channels 110 and 112, hot water body 102 and central body 106 of coupler 100 cooperate to define an L-shaped, intermediate hot water channel 114, and cold water body 104 and central body 106 of coupler 100 cooperate to define an L-shaped intermediate cold water channel 116. The L-shaped intermediate hot water channel 114 includes a vertical portion 114a and a horizontal portion 114b, and the L-shaped intermediate cold water channel 116 includes a vertical portion 116a and a horizontal portion 116b. In the center of coupler 100, between intermediate channels 114 and 116, central body 106 defines outlet channel 118.

In operation, hot water from hot water inlet tube 20 (shown in phantom in FIG. 5) flows upwardly through hot water inlet channel 110 of coupler 100 along arrow $H_1$, and cold water from cold water inlet tube 22 (shown in phantom in FIG. 5) flows upwardly through cold water inlet channel 112 of coupler 100 along arrow $C_1$. Next, the hot and cold water exits coupler 100 and flows through valves 30 and 32 (shown in phantom in FIG. 5) along arrows $H_2$ and $C_2$, respectively. Then, the hot and cold water re-enters coupler 100 and flows through intermediate hot water channel 114 and intermediate cold water channel 116 of coupler 100 along arrows $H_3$ and $C_3$, respectively. Finally, the hot and cold water combines to form a mixed water stream that flows upwardly through outlet channel 118 of coupler 100 along arrow O and into outlet tube 42 (shown in phantom in FIG. 5) for delivery to a sink basin or a tub basin (not shown), for example.

To provide leak-resistant, fluid communication between coupler 100 and inlet tubes 20 and 22 (e.g., along arrows $H_1$ and $C_1$ of FIG. 5), coupler 100 may be overmolded about inlet tubes 20 and 22. Specifically, hot water body 102 of coupler 100 may be overmolded about proximal end 20a of hot water inlet tube 20, and cold water body 104 of coupler 100 may be overmolded about proximal end 22a of cold water inlet tube 22. An illustrative method for overmolding coupler 100 about inlet tubes 20 and 22 is discussed further below.

To provide leak-resistant, fluid communication between coupler 100 and valves 30 and 32 (e.g., along arrows $H_2$ and $C_2$ of FIG. 5), coupler 100 may support and interface with valves 30 and 32. In the illustrative embodiment of FIG. 5, hot water body 102 extends over central body 106 of coupler 100 to define first valve interface 120 for receiving and supporting hot water valve 30 and, on the other end of coupler 100, cold water body 104 extends over central body 106 of coupler 100 to define second valve interface 122 for receiving and supporting cold water valve 32. It is also within the scope of the present disclosure that hot water body 102 and central body 106 may cooperate to define first valve interface 120 and that cold water body 104 and central body 106 may cooperate to define second valve interface 122.

Each valve interface 120 and 122 of the illustrative coupler 100 includes an upwardly projecting inlet wall 124 that surrounds and defines a portion of the corresponding inlet channel 110 and 112 and an upwardly projecting outlet wall 126 that surrounds and defines a portion of the corresponding intermediate channel 114 and 116. When assembled, inlet walls 124 of each valve interface 120 and 122 direct fluid into respective inlets of valves 30 and 32, and outlet walls 126 of each valve interface 120 and 122 receive fluid from respective outlets of valves 30 and 32. In the illustrative embodiment of FIG. 2, inlet wall 124 and outlet wall 126 of each valve interface 120 and 122 are substantially D-shaped to provide adequate support for and sealing with valves 30 and 32. Between and around each inlet wall 124 and outlet wall 126, each valve interface 120 and 122 may include a recess or trench 128 for receiving a suitable gasket 129 (FIG. 5). Also, as shown in FIG. 2, each valve interface 120 and 122 may include one or more peripheral locating notches 130 for receiving corresponding locating tabs 132 on valves 30 and 32, respectively, to facilitate orientation therebetween.

To provide leak-resistant, fluid communication between coupler 100 and outlet tube 42 (e.g., along arrow O of FIG. 5), coupler 100 may support and interface with outlet tube 42. For example, in the illustrative embodiment of FIG. 5, outlet tube 42 is sized for fluid-tight receipt within outlet channel 118 of coupler 100. This coupling may be enhanced by the presence of counterbore 140 for receiving sealing ring 44, which is described above with respect to FIG. 2, between collar 46 of outlet tube 42 and coupler 100.

Returning to FIG. 2, base 12 may define recess 60 that is sized and shaped to receive and support coupler 100 in faucet 10. The underside of coupler 100 may include suitable locating notches 62 (FIG. 5) and base 12 may include corresponding pegs (not shown) to properly locate coupler 100 within recess 60 of base 12. Also, faucet 10 may include sealing rings 64 to provide a seal between coupler 100 and base 12. Each sealing ring 64 may be in the form of an elastomeric O-ring, for example. Base 12 may be configured to engage threaded bonnet nuts (not shown) for tightening valves 30 and 32 onto coupler 100.

Additional information regarding faucet 10 and coupler 100 may be found in International Patent Publication No. WO 2009/126887, entitled "Molded Waterway for a Two Handle Faucet," the entire disclosure of which is expressly incorporated by reference herein.

As further detailed herein, and as shown in FIG. 5, coupler 100 is constructed of a flowable material which is molded in a two-step process to form hot water inlet channel 110, cold water inlet channel 112, intermediate hot water channel 114, intermediate cold water channel 116, and outlet channel 118. While any suitable material may be used to form coupler 100, a polymer, including thermoplastics and thermosets, is utilized in the illustrative embodiment. Specifically, polyethylene is utilized in the illustrative embodiment to form coupler 100, and the polyethylene is then subsequently cross-linked. It should be noted that reinforcing members, such as glass fibers, may be provided within the polyethylene of coupler 100.

The basic principles of overmolding plumbing connections on tubes are shown in U.S. Pat. Nos. 5,895,695; 6,082,780; 6,287,501; and 6,902,210. U.S. Pat. No. 7,766,043 and U.S. Application Publication No. 2007/0044852 also disclose illustrative overmolding about water inlet tubes.

With reference now to FIGS. 6-14, an illustrative method 200 is provided for forming the waterway assembly 90 of the present disclosure. In FIGS. 7-9 and 12-14, one side (i.e., the cold water side) of coupler 100 is illustrated, but it will be understood that similar steps may be performed to construct the opposite side (i.e., the hot water side) of coupler 100.

Figure 7:
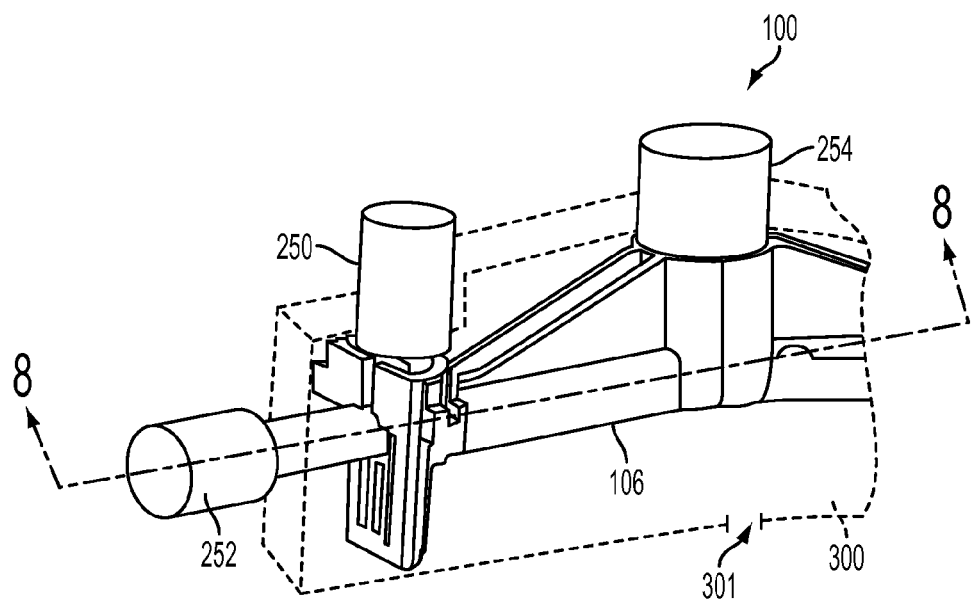
FIG. 7 is a partial rear perspective view of the central body of the molded waterway during a first molding step.
Figure 8:
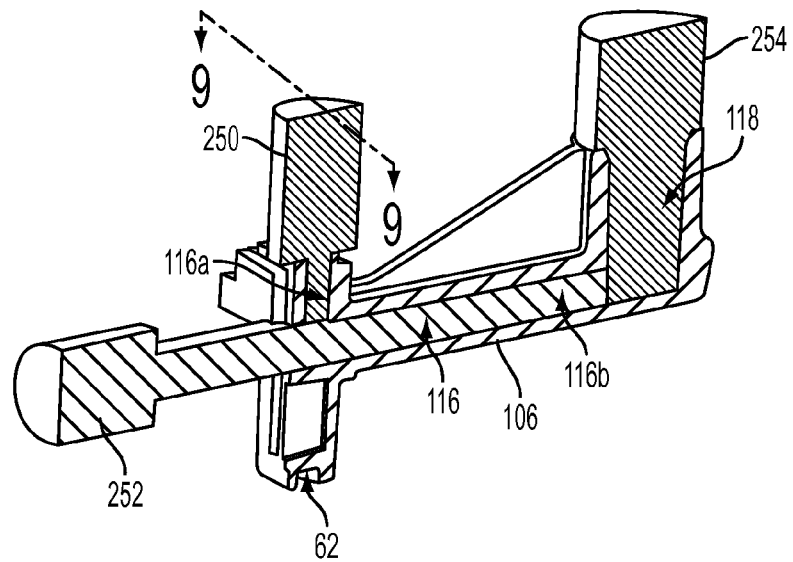
FIG. 8 is a cross-sectional view of the central body of FIG. 7, taken along line 8-8 of FIG. 7.

In a first molding step 202 of the illustrative method 200, central body 106 of coupler 100 is formed. Step 202 is performed using a suitable first mold 300 (shown in phantom in FIG. 7) to define the exterior shape of central body 106 and core pins 250, 252, and 254 to define the interior shape of central body 106. As shown in FIGS. 7 and 8, first core pin 250 may be oriented vertically in the mold 300 and second core pin 252 may be oriented horizontally in the mold 300 (i.e., perpendicular to first core pin 250) to cooperatively define the L-shaped intermediate cold water channel 116 in central body 106. More specifically, first core pin 250 may be oriented vertically in the mold 300 to define the vertical portion 116a of intermediate cold water channel 116 and second core pin 252 may be oriented horizontally in the mold 300 to define the horizontal portion 116b of intermediate cold water channel 116. On the opposite side of coupler 100, a similar first core pin 250 and second core pin 252 may be used to form intermediate hot water channel 114 in central body 106. As shown in FIGS. 7 and 8, third core pin 254 may extend vertically in the mold 300 (i.e., parallel to first core pin 250) to define outlet channel 118 in central body 106. Although referred to herein as the first, second, and third core pins 250, 252, and 254, the core pins 250, 252, and 254 may be inserted into the mold 300 in any order.

Figure 9:
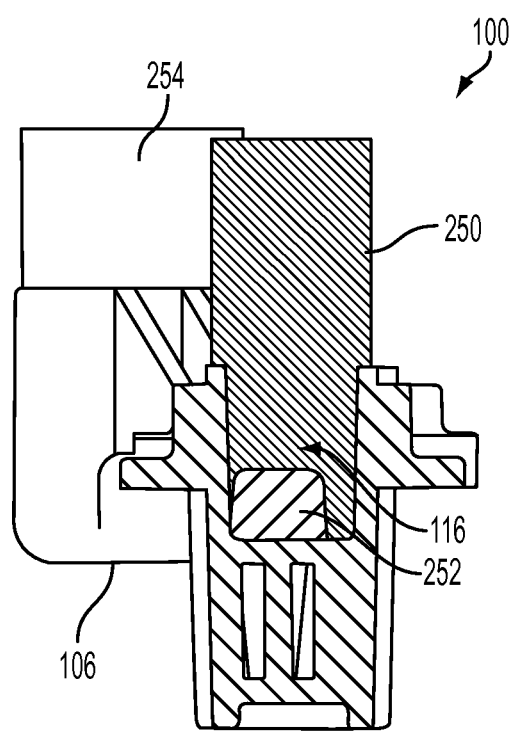
FIG. 9 is a cross-sectional view of the central body of FIG. 8, taken along line 9-9 of FIG. 8.

To prevent material from leaking into intermediate channels 114 and 116 during the molding process, especially at the elbow or bend where each vertical portion 114a and 116a meets its respective horizontal portion 114b and 116b, each first core pin 250 may at least partially straddle the corresponding second core pin 252, as shown in FIG. 9. Such leakages could lead to obstructions or blockages within intermediate channels 114 and 116.

Figure 10:
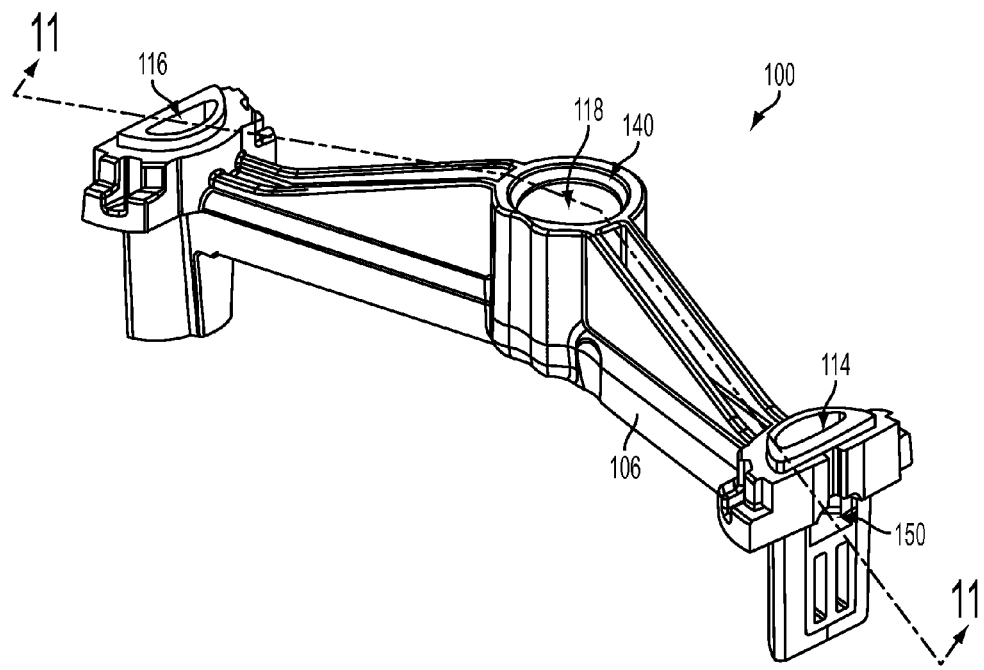
FIG. 10 is a rear perspective view of the central body following the first molding step of FIG. 7.
Figure 11:
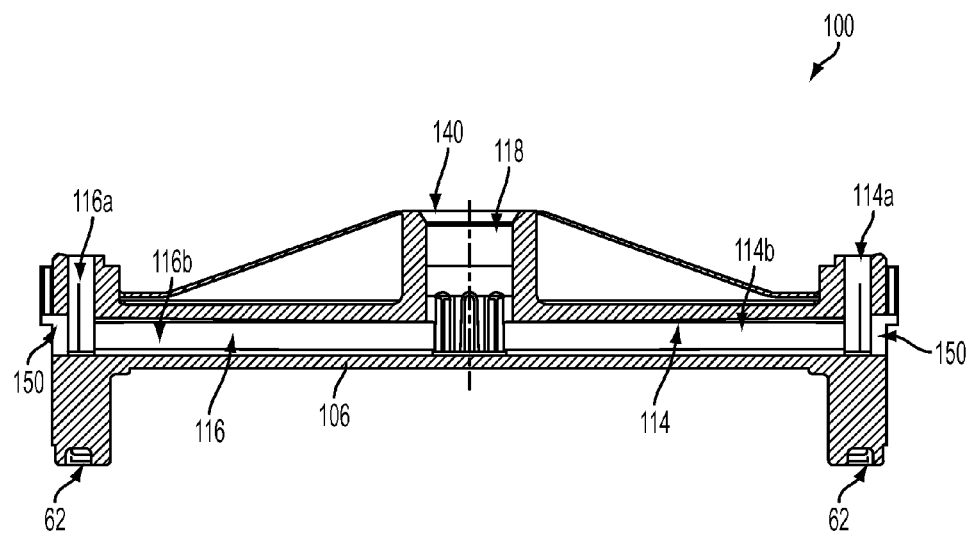
FIG. 11 is cross-sectional view of the central body of FIG. 10, taken along line 11-11 of FIG. 10.

During step 202, a flowable material, illustratively a polymer such as polyethylene, is injected into inlet 301 of the first mold 300 and around core pins 250, 252, and 254. Then, the material is allowed to cool. Finally, central body 106 is removed from the mold 300 and core pins 250, 252, and 254 are removed or withdrawn. Exterior openings 150 will be visible in each side of central body 106 in the space once occupied by second core pins 252, as shown in FIGS. 10 and 11.

In a second molding step 204 of the illustrative method 200, hot water body 102 and cold water body 104 of coupler 100 are overmolded around the previously formed central body 106 of coupler 100 and around inlet tubes 20 and 22. In certain embodiments, bodies 102 and 104 of coupler 100 may be formed substantially simultaneously. In other embodiments, bodies 102 and 104 of coupler 100 may be formed in series.

Figure 12:
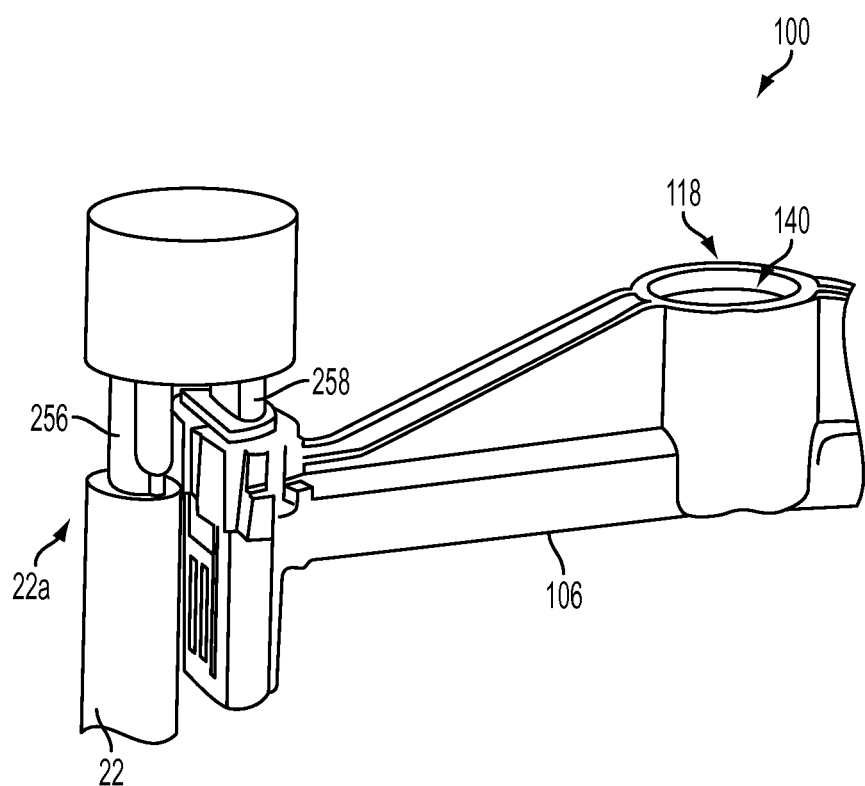
FIG. 12 is a partial rear perspective view of the central body of the molded waterway before a second molding step.
Figure 13:
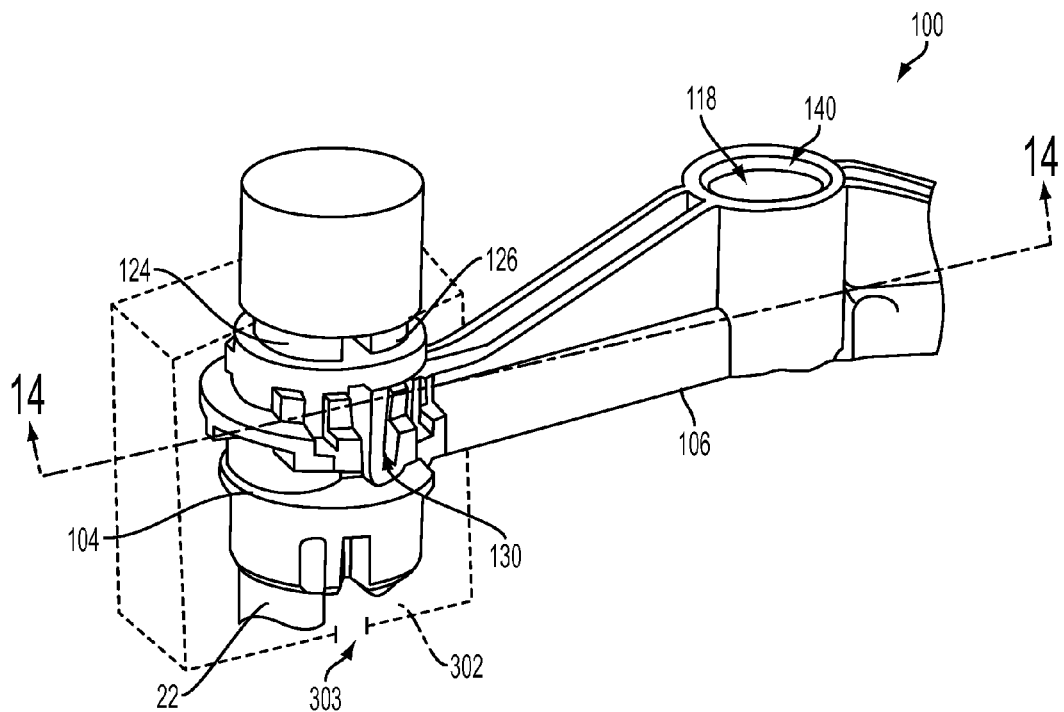
FIG. 13 is a partial rear perspective view of the molded waterway during a second molding step.
Figure 14:
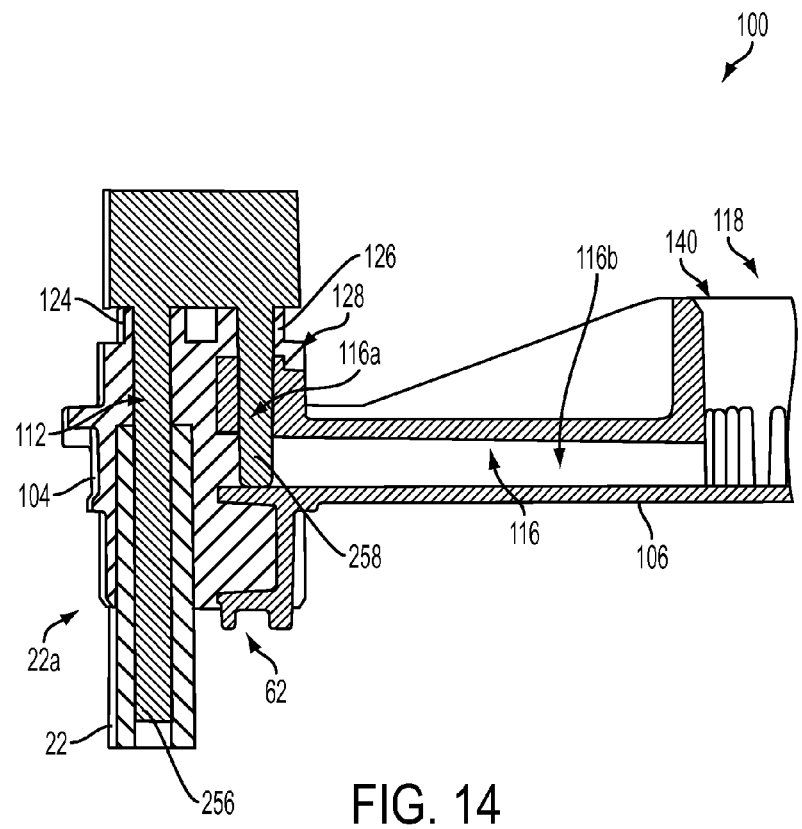
FIG. 14 is cross-sectional view of the molded waterway of FIG. 13, taken along line 14-14 of FIG. 13.

Step 204 is performed using one or more suitable second molds 302 (shown in phantom in FIG. 13) to define the exterior shape of bodies 102 and 104 and core pins 256 and 258 to define the interior shape of bodies 102 and 104. Core pins 256 and 258 may be distinct components or, as shown in FIG. 12-14, core pins 256 and 258 may be interconnected. Fourth core pin 256 may be oriented vertically in the mold 302 to receive proximal end 22a of cold water inlet tube 22 and to define cold water inlet channel 112 in cold water body 104 of coupler 100. On the opposite side of coupler 100, a similar fourth core pin 256 may be used to receive proximal end 20a of hot water inlet tube 20 and to define hot water inlet channel 110 in hot water body 102 of coupler 100. Fifth core pin 258 may also be oriented vertically in the mold 302 (i.e., parallel to fourth core pin 256) to define the remainder of the vertical portion 116a of intermediate cold water channel 116 that extends through cold water body 104 of coupler 100. Also, fifth core pin 258 may at least partially fill intermediate cold water channel 116 while leaving opening 150 in central body 106 of coupler 100 exposed. On the opposite side of coupler 100, a similar fifth core pin 258 may be used to define the remainder of the vertical portion 114a of intermediate hot water channel 114 that extends through hot water body 102 of coupler 100 and to at least partially fill intermediate hot water channel 114 while leaving opening 150 in central body 106 of coupler 100 exposed. Although referred to herein as the fourth and fifth core pins 256 and 258, the core pins 256 and 258 may be inserted into the mold 302 in any order.

During step 204, a flowable material, illustratively a polymer such as polyethylene, is injected into inlet 303 of each second mold 302 and around core pins 256 and 258. Then, the material is allowed to cool. Finally, coupler 100 is removed from the molds 302 and core pins 256 and 258 are removed or withdrawn. The resulting molded waterway assembly 90 is shown in FIGS. 2 and 5. Because openings 150 in central body 106 of coupler 100 were exposed to the flowable material in the molds 302, bodies 102 and 104 of coupler 100 now fill openings 150.

Optionally, in step 206 of method 200, the molded waterway assembly 90 is cross-linked. For example, if the molded waterway assembly 90 is constructed of polyethylene during the first and second molding steps 202 and 204, the polyethylene of inlet tubes 20 and 22 and coupler 100 (which have not been cross-linked or have been only partially cross-linked) may be cross-linked during step 206 to form cross-linked polyethylene (PEX). While it is envisioned that any form of suitable cross-linking may be utilized to form the PEX of inlet tubes 20 and 22 and coupler 100, in one illustrative embodiment the polyethylene is cross-linked by bombarding it with electromagnetic (gamma) or high energy electron (beta) radiation.

In the illustrative embodiment, no subsequent machining operations are required to finish coupler 100. For example, no subsequent machining operations are required to prepare first valve interface 120 of coupler 100 to receive hot water valve 30 or to prepare second valve interface 122 of coupler 100 to receive cold water valve 32. Also, no subsequent machining operations are required to prepare outlet channel 118 of coupler 100 to receive outlet tube 42.

The illustrative method 200 involves overmolding hot water body 102 and cold water body 104 of coupler 100 around a previously formed central body 106 of coupler 100 and around inlet tubes 20 and 22. While the precise composition of inlet tubes 20 and 22 and coupler 100 are not required to be of any specified polymer, in general, there are several guidelines which are applicable in the practice of the illustrative embodiment. It is of course, recognized that the precise operating conditions utilized in the overmolding process are well-known in the art and are specific to each molded polymer. It is well within the skill of the art to determine the applicable conditions which will result in the appropriate inlet tubes 20 and 22 and coupler 100. Inlet tubes 20 and 22 and coupler 100 may be a thermoplastic or a thermoset. Illustratively, the polymer overmolded bodies 102 and 104 of coupler 100 should be capable of forming leak-proof bonds, either chemical or physical, with the polymer of the underlying inlet tubes 20 and 22 and with the polymer of the underlying central body 106 of coupler 100.

Illustrative and non-limiting examples of the polymers which may be used in various combinations to form the underlying inlet tubes 20 and 22 and central body 106 of coupler 100, as well as polymers which may be used in the overmolding process to form bodies 102 and 104 of coupler 100, include: polyacetals, typically highly crystalline linear thermoplastic polymers of oxymethylene units; poly(meth) acrylics, typically belonging to two families of esters, acrylates and methacrylates; polyarylether ketones containing ether and ketone groups combined with phenyl rings in different sequences and polyether ketones; polyacrylonitrile resins wherein the principal monomer is acrylonitrile; nylons or polyamides, including various types of nylon-6, nylon-6/6, nylon-6/9, nylon-6/10, nylon-6/12, nylon-11, nylon-12; polyamide-imides formed by the condensation of trimellitic anhydride and various aromatic diamines; polyacrylates of aromatic polyesters derived from aromatic dicarboxylic acids and diphenols; polybutene resins based on poly(1-butene); polycarbonates, typically based on bisphenol A reacted with carbonyl chloride; polyalkylene terephthalates typically formed in a transesterification reaction between a diol and dimethyl terephthalate; polyetherimides, based on repeating aromatic imide and ether units; polyethylene homopolymers and copolymers, including all molecular weight and density ranges and degrees of crosslinking; polypropylene homopolymers and copolymers; ethylene acid copolymers from the copolymerization of ethylene with acrylic or methacrylic acid or their corresponding acrylate resins; ethylene-vinyl acetate copolymers from the copolymerization of ethylene and vinyl acetate; ethylene-vinyl alcohol copolymers; polyimides derived from the aromatic diamines and aromatic dianhydrides; polyphenylene oxides including polystyrene miscible blends; polyphenylene sulfides; acrylonitrile butadiene styrene terpolymers; polystyrenes; styrene-acrylonitrile copolymers; styrene-butadiene copolymers thermoplastic block copolymers; styrene maleic anhydride copolymers; polyarylsulfones; polyethersulfones; polysulfones; thermoplastic elastomers covering a hardness range of from 30 Shore A to 75 Shore D, including styrenic block copolymers, polyolefin blends (TPOS), elastomeric alloys, thermoplastic polyurethanes (TPUS), thermoplastic copolyesters, and thermoplastic polyamides; polyvinyl chlorides and chlorinated polyvinyl chlorides; polyvinylidene chlorides; allyl thermosets of allyl esters based on monobasic and dibasic acids; bismaleimides based generally on the condensation reaction of a diamine with maleic anhydride; epoxy resins containing the epoxy or oxirane group, including those epoxy resins based on bisphenol A and epichlorohydrin as well as those based on the epoxidation of multifunctional structures derived from phenols and formaldehyde or aromatic amines and aminophenols; phenolic resins; unsaturated thermoset polyesters including those of the condensation product of an unsaturated dibasic acid (typically maleic anhydride) and a glycol, wherein the degree of unsaturation is varied by including a saturated dibasic acid; thermoset polyimides; polyurethanes containing a plurality of carbamate linkages; and urea and melamine formaldehyde resins (typically formed by the controlled reaction of formaldehyde with various compounds that contain the amino group).

The combination of the above polymers illustratively satisfy at least two simultaneous conditions. First, the underlying inlet tubes 20 and 22 and central body 106 of coupler 100 illustratively do not soften and begin melt flow to the point where they lose structural integrity. Thus, according to the illustrative embodiment, the underlying inlet tubes 20 and 22 and central body 106 of coupler 100 are capable of maintaining structural integrity during the overmolding conditions during which the overmolded polymer is in melt flow. Second, the overmolded bodies 102 and 104 of coupler 100 are illustratively capable of forming an essentially leak-proof interface with the underlying plastic, preferably through either a chemical and/or physical bond between the overmolded plastic and the underlying plastic.

While using polymer compositions which have differing softening points is one way to achieve the above objectives, there are alternatives, one of which would include the use of two compositions which have the same softening point, but which are of different thickness. Through manipulation of the time, temperature, and pressure conditions experienced during the molding operation, the underlying inlet tubes 20 and 22 and central body 106 of coupler 100 would not experience melt flow, even though they had a similar softening point or range. It is also possible that, through the incorporation of various additives in the polymeric compositions (e.g., glass fibers, heat stabilizers, anti-oxidants, plasticizers, etc.), the softening temperatures of the polymers may be controlled.

In an illustrative embodiment of the invention, the composition of the overmolded bodies 102 and 104 of coupler 100 will be such that they will be capable of at least some melt fusion with the composition of the underlying inlet tubes 20 and 22 and central body 106 of coupler 100, thereby maximizing the leak-proof characteristics of the interface between the underlying inlet tubes 20 and 22 and the overmolded bodies 102 and 104 of coupler 100 and the interface between the underlying central body 106 of coupler 100 and the overmolded bodies 102 and 104 of coupler 100. There are several means by which such melt fusion may be effected. One of the simplest procedures is to ensure that at least a component of the underlying inlet tubes 20 and 22 and central body 106 of coupler 100 is the same as that of the overmolded bodies 102 and 104 of coupler 100. Alternatively, it would be possible to ensure that at least a portion of the polymer composition of the underlying inlet tubes 20 and 22 and central body 106 of coupler 100 is sufficiently similar or compatible with that of the overmolded bodies 102 and 104 of coupler 100 so as to permit the melt fusion or blending or alloying to occur at least in interfacial regions. For example, the polymer composition of the underlying inlet tubes 20 and 22 and central body 106 of coupler 100 and the polymer composition of the overmolded bodies 102 and 104 of coupler 100 may be miscible.

In another illustrative embodiment of the invention, composites of rubber/thermoplastic blends are useful in adhering to thermoplastic materials used in inlet tubes 20 and 22. These blends are typically in the form of a thermoplastic matrix containing rubber nodules functionalized and vulcanized during the mixing with the thermoplastic. Composite bodies 102 and 104 of coupler 100 may be formed by overmolding the vulcanized rubber/thermoplastic blend onto the thermoplastic inlet tubes 20 and 22. In this manner, the cohesion at the interface between these two materials is generally higher than the tensile strength of each of the two materials.

Although the invention has been described in detail with reference to certain preferred embodiments, variations and modifications exist within the spirit and scope of the invention as described and defined in the following claims.

The invention claimed is:

1. A waterway assembly for use with a centerset faucet, the faucet including a hot water valve, a cold water valve, and an outlet tube, the waterway assembly comprising a hot water inlet tube including opposing proximal and distal ends, a cold water inlet tube including opposing proximal and distal ends, and a coupler including a central body that defines a hot water intermediate channel, a cold water intermediate channel, and an outlet channel, the outlet channel, the hot water intermediate channel and the cold water intermediate channel formed integrally as a continuous unitary molded structure by the central body, the hot water intermediate channel configured to direct fluid from the hot water valve to the outlet channel, the cold water intermediate channel configured to direct fluid from the cold water valve to the outlet channel, and the outlet channel configured to direct fluid from the hot and cold water intermediate channels to the outlet tube, a hot water body overmolded onto the central body and the proximal end of the hot water inlet tube, the hot water body defining a hot water inlet channel configured to direct fluid from the hot water inlet tube to the hot water valve, and a cold water body overmolded onto the central body and the proximal end of the cold water inlet tube, the cold water body defining a cold water inlet channel configured to direct fluid from the cold water inlet tube to the cold water valve.

2. The waterway assembly of claim 1, wherein the hot water body extends at least partially over the central body to define a hot water valve interface for receiving and supporting the hot water valve and the cold water body extends at least partially over the central body to define a cold water valve interface for receiving and supporting the cold water valve.

3. The waterway assembly of claim 1, wherein the hot water body fills a first exterior opening in the central body and the cold water body fills a second exterior opening in the central body.

4. The waterway assembly of claim 1, wherein the hot water inlet tube and the cold water inlet tube are formed of a polymer.

5. The waterway assembly of claim 1, wherein the hot water inlet tube and the cold water inlet tube are formed of cross-linked polyethylene.

6. The waterway assembly of claim 1, wherein the coupler is formed of a polymer.

7. The waterway assembly of claim 1, wherein the coupler is formed of cross-linked polyethylene.

8. The waterway assembly of claim 6, wherein the outlet channel, the hot water intermediate channel and the cold water intermediate channel are integrally molded within the central body.

9. The waterway assembly of claim 1, wherein the hot water intermediate channel is L-shaped as including a hot water vertical portion and a hot water horizontal portion extending from the hot water vertical portion to the outlet channel, and the cold water intermediate channel is L-shaped as including a cold water vertical portion and a cold water horizontal portion extending from the cold water vertical portion to the outlet channel.

10. The waterway assembly of claim 9, wherein the hot water vertical portion is defined by the hot water body, the hot water horizontal portion is defined by the central body, the cold water vertical portion is defined by the cold water body, and the cold water horizontal portion is defined by the central body.

11. The waterway assembly of claim 10, further comprising a hot water inlet channel defined by the hot water body and extending parallel to the hot water vertical portion of the hot water intermediate channel, and a cold water inlet channel defined by the cold water body and extending parallel to the cold water vertical portion of the cold water intermediate channel.

* * * * *